United States Patent
Abuelsaad et al.

(10) Patent No.: US 8,930,479 B2
(45) Date of Patent: *Jan. 6, 2015

(54) PROCESSING CELLULAR TELEPHONE SUBSCRIPTION FOR E-MAIL THREADS

(71) Applicant: International Business Machines Corporation, Armonk, NY (US)

(72) Inventors: Kelly Abuelsaad, Somers, NY (US); Tamer E. Abuelsaad, Somers, NY (US); Candice B. Gilzean, Austin, TX (US); Muniasamy Subramanian, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/900,050

(22) Filed: May 22, 2013

(65) Prior Publication Data

US 2013/0267264 A1 Oct. 10, 2013

Related U.S. Application Data

(63) Continuation of application No. 12/200,080, filed on Aug. 28, 2008, now Pat. No. 8,489,690.

(51) Int. Cl.
| | | |
|---|---|---|
| *G06F 15/16* | (2006.01) | |
| *H04W 4/14* | (2009.01) | |
| *H04L 12/58* | (2006.01) | |
| *H04W 4/12* | (2009.01) | |

(52) U.S. Cl.
CPC .............. *H04W 4/14* (2013.01); *H04L 12/587* (2013.01); *H04L 51/24* (2013.01); *H04L 12/5895* (2013.01); *H04W 4/12* (2013.01)

USPC ........ 709/206; 709/203; 709/219; 455/412.1; 455/412.2; 455/414.3; 455/466

(58) Field of Classification Search
CPC ... H04L 12/587; H04L 12/5895; H04L 51/24; H04W 4/14; H04W 4/12
USPC ......... 455/466, 412.1, 412.2, 414.1; 709/206, 709/207, 203, 217, 219; 379/88.12
See application file for complete search history.

(56) References Cited

U.S. PATENT DOCUMENTS 8,489,690 B2    7/2013    Abuelsaad et al.

OTHER PUBLICATIONS

Office Action (Mail Date Apr. 28, 2011) for U.S. Appl No. 12/200,080, filed Aug. 28. 2008, First Named Inventor Tamer E. Abuelsaad.
Amendment (Filed Jul. 27, 2011) for U.S. Appl. No. 12/200,080, filed Aug. 28, 2008, First Named Inventor Tamer E. Abuelsaad.

(Continued)

*Primary Examiner* — Charles Shedrick
(74) *Attorney, Agent, or Firm* — Schmeiser, Olsen & Watts, LLP; Mark C. Vallone

(57) ABSTRACT

A method and system for processing a subscription to an e-mail message thread. Short Message Service (SMS) data is assigned to a mobile device. Both a telephone number associated with the mobile device and the assigned SMS data are assigned to a setting in a database stored in an e-mail message server. A subscription to updates related to an e-mail message thread associated with the e-mail message server is created. The creation of the subscription includes correlating the telephone number and the SMS data to a unique e-mail message thread identifier of the e-mail message thread. The updates related to the e-mail message thread are sent to the mobile device via the e-mail message server.

20 Claims, 6 Drawing Sheets

(56) References Cited

OTHER PUBLICATIONS

Office Action (Mail Date Oct. 19, 2011) for U.S. Appl. No. 12/200,080, filed Aug. 28, 2008, First Named Inventor Tamer E. Abuelsaad.
RCE (Filed Jan. 13, 2012) for U.S. Appl. No. 12/200,080, filed Aug. 28, 2008, First Named Inventor Tamer E. Abuelsaad.
Office Action (Mail Date Mar. 9, 2012) for U.S. Appl. No. 12/200,080, filed Aug. 28, 2008, First Named Inventor Tamer E. Abuelsaad.
Amendment (Filed Aug. 7, 2012) for U.S. Appl. No. 12/200,080, filed Aug. 28, 2008, First Named Inventor Tamer E. Abuelsaad.
Office Action (Mail Date Sep. 17, 2012) for U.S. Appl. No. 12/200,080, filed Aug. 28, 2008, First Named Inventor Tamer E. Abuelsaad.
Amendment (Filed Nov. 19, 2012) for U.S. Appl. No. 12/200,080, filed Aug. 28, 2008, First Named Inventor Tamer E. Abuelsaad.
Notice of Allowance (Mail Date Mar. 12, 2013) for U.S. Appl. No. 12/200,080, filed Aug. 28, 2008, First Named Inventor Tamer E. Abuelsaad.
Teleflip, [Retrieved on Jun. 30, 2008], Retrieved from the Internet: < URL: http://www.1teleflip.com/>, 1 page.
LavaTech: Wireless Mail [Retrieved on Jun. 30, 2008], Retrieved from the Internet: < URL: http://www.lotusnotes.com/Site/ID/WMFeatures>, 5 pages.
Gmail Mobile, [Retrieved on Jun. 30, 2008], Retrieved from the Internet: < URL: http://mail.google.com/mail/help/intl/en/about_mobile.html>, 1 page.
SSi Service Strategies, Inc., Text to Speech, [Retrieved on Jun. 30, 2008], Retrieved from the Internet: < URL: http://www.wireless-message.com/wireless_text_speech.htm>, 3 pages.
ipipi.com, Send email from SMS Phone, [Retrieved on Jun. 30, 2008], Retrieved from the Internet: < URL: http://www.ipipi.com/help/helpsms_email.htm>, 2 pages.

PROCESSING CELLULAR TELEPHONE SUBSCRIPTION FOR E-MAIL THREADS

This application is a continuation application claiming priority to Ser. No. 12/200,080, filed Aug. 28, 2008, now U.S. Pat. No. 8,489,690, issued Jul. 16, 2013.

TECHNICAL FIELD

Embodiments are generally related to data-processing systems and methods. Embodiments are additionally related to the field of computers and similar technologies, and in particular, to software utilized in this field. In addition, embodiments also relate to methods and systems for providing a cell phone subscription for e-mail message threads.

BACKGROUND OF THE INVENTION

A large number of communication systems have been developed that are utilized extensively to send and receive data. Such systems generally include conventional landline telephone systems, wireless communication systems and electronic messaging (i.e., e-mail) systems. These systems, particularly the wireless communication and e-mail systems, have allowed people to greatly increase mobility, while still being able to access such communication systems for receiving or sending data.

E-mail systems and associated protocols are often utilized to facilitate communication between two users of a network or e-mail system. Each user possesses a unique network address, which may be utilized for routing and identification purposes with respect to delivering an e-mail message from one user (a "sender") to another user (a "recipient") on the network. Such e-mail systems are extremely powerful tools, but still have some drawbacks and limitations. Typical e-mail systems do not provide updates or alerts to users associated with a particular e-mail thread, if needed. For example, a user's own personal computer may be configured to alert the user when an e-mail message is received. However, many users log in only periodically to check for e-mail messages. Thus, if an important e-mail message arrives while the user is not logged in or is away (e.g., on vacation) from his or her personal computer terminal, the user may not be aware of such updates.

Based on the foregoing, it is believed that a need exists for an improved method and/or system that is capable of providing a cell phone subscription for e-mail threads. A need also exists for a method for providing easy and quick access with respect to the transmission of important e-mail updates to a mobile device.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system and computer-usable medium.

It is another aspect of the present invention to provide for a method, system and computer-usable medium for providing a cell phone subscription to a user with respect to e-mail threads.

It is a further aspect of the present invention to provide for a method, system and computer-usable medium for transmitting important e-mail updates to a mobile device via a text message and/or text-to-speech voice message.

The aforementioned aspects and other objectives and advantages can now be achieved as described herein. A method and system for providing cell phone subscription for e-mail message threads is disclosed. A number associated with a mobile device can be incorporated and/or adapted for use with the mobile device as a technique for contact configuration setting on an e-mail server. Thereafter, updates to an e-mail message thread can be "subscribed" to via a graphically displayed "option button" within the e-mail message. Such an option button may be displayed within, for example, a GUI (Graphical User Interface). The updates to the subscribed e-mail message thread can be sent to the mobile device via a text and/or text-to-speech voice message in order to allow users to view and/or listen to updates. Such an approach relies on modification of e-mail server software in order to ensure privacy of data. Users can also be provided with an option to unsubscribe from receiving alerts by selecting an "unsubscribe" option from the e-mail message thread.

When a person subscribes for updates related to an email thread, the mobile number and SMS data related to the subscription can be tied to the ID associated with the e-mail message thread on the server. The server can send a Short Message Service (SMS) message to all mobile subscribers responsive to receiving an update posted to the thread. A reply to the updated e-mail message thread (i.e. a next thread update) can also be sent to the e-mail server which then distributes the updated thread to the users associated with the e-mail message thread. Each update to the e-mail message thread can be received as a text message or as voicemails, which can be helpful for visually impaired users. Similarly, the number assigned to the mobile device is not visible to others in order to ensure privacy of the data. Such a method and/or system as described herein can provide easy and quick access for transmitting important e-mail updates to a mobile device.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
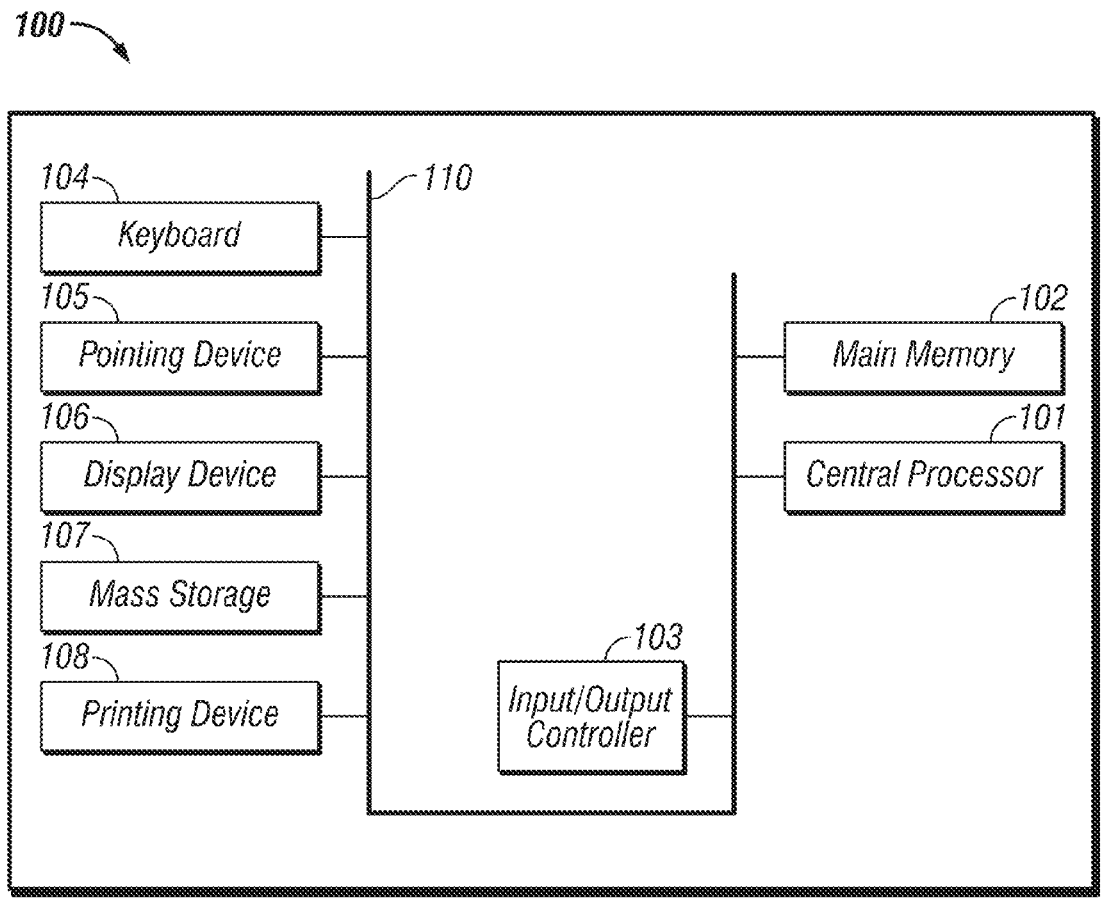
FIG. 1 illustrates a schematic view of a computer system, in which the present invention may be embodied.
Figure 2:
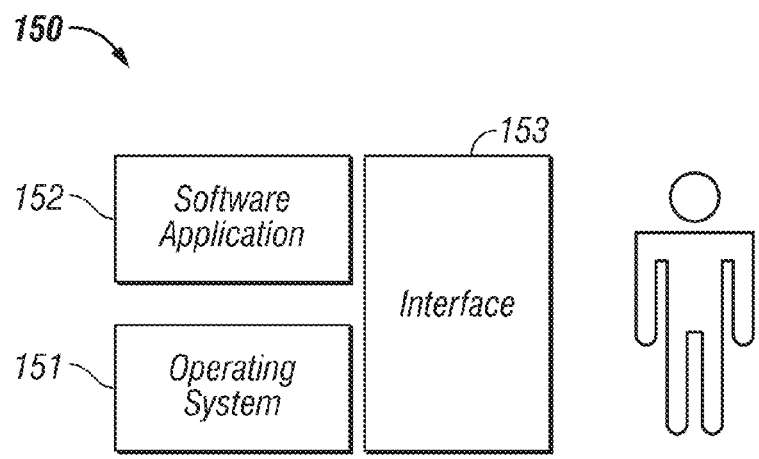
FIG. 2 illustrates a schematic view of a software system including an operating system, application software, and a user interface for carrying out the present invention.
Figure 3:
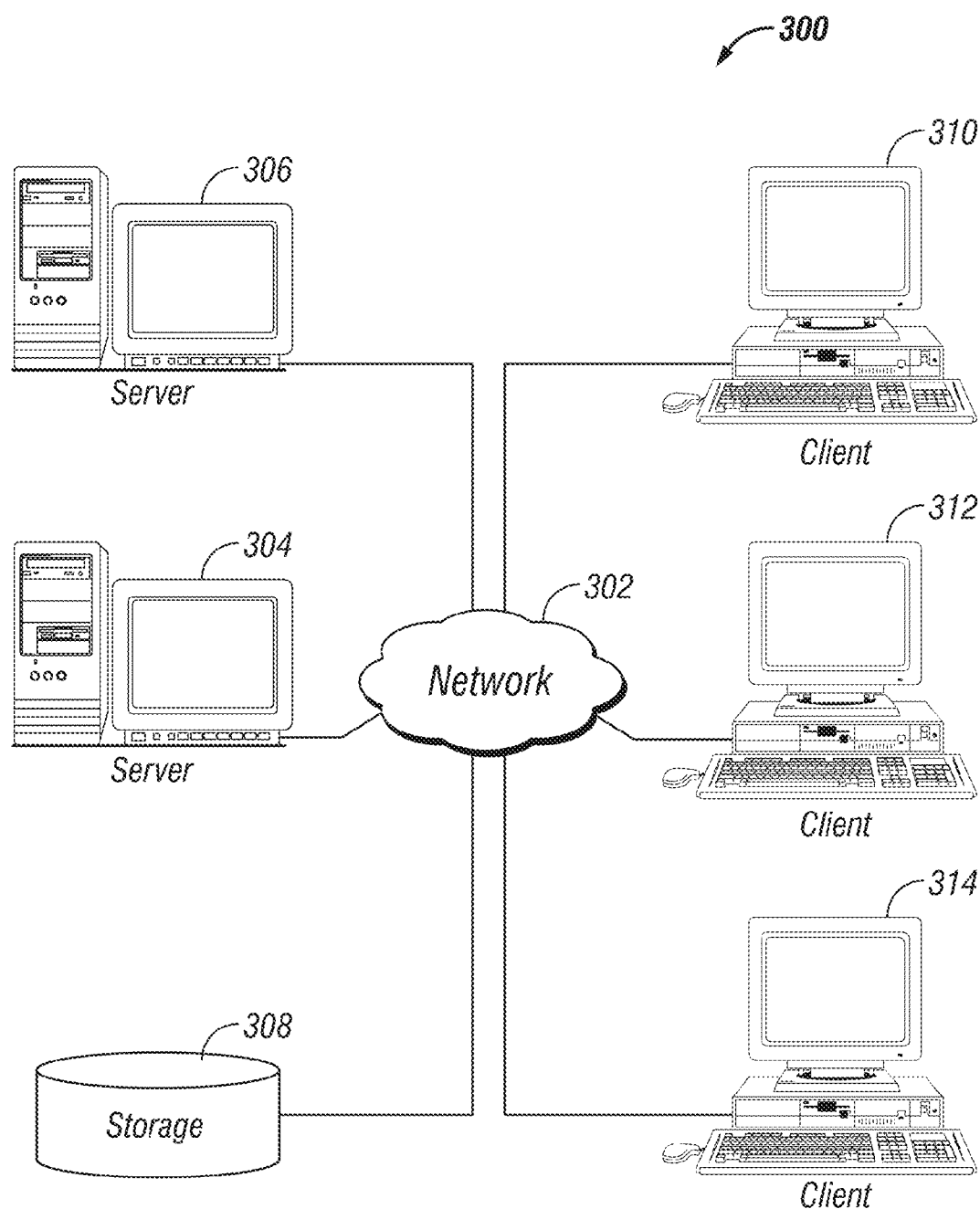
FIG. 3 illustrates a graphical representation of a network of data processing systems, in which aspects of the present invention may be implemented.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 illustrates the present invention which may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the data-processing apparatus 100 as desired. As illustrated, the various components of the data-processing apparatus 100 communicate through a system bus 110 or similar architecture.

FIG. 2 illustrates a computer software system 150 provided for directing the operation of the data-processing apparatus 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the data-processing apparatus 100. The data-processing apparatus 100 receives user commands and data through user interface 153; these inputs may then be acted upon by the data-processing apparatus 100 in accordance with instructions from operating module 151 and/or application module 152.

The interface 153 is preferably a graphical user interface (GUI). In one potential embodiment, operating system 151 and interface 153 can be implemented in the context of a "Windows" system. Application module 152, on the other hand, can include instructions, such as for directing the various operations described herein with respect to the various components and modules described herein, such as, for example, the method 500 depicted in FIG. 5.

FIG. 3 illustrates a graphical representation of a network of data processing systems in which aspects of the present invention may be implemented. Network data processing system 300 is a network of computers in which embodiments of the present invention may be implemented. Network data processing system 300 contains network 302, which is the medium used to provide communications links between various devices and computers connected together within network data processing apparatus 100. Network 302 may include connections, such as wire, wireless communication links, or fiber optic cables.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing apparatus 100 depicted in FIG. 1 can be, for example, a client such as client 310, 312, and/or 314. Alternatively, data-processing apparatus 100 can be implemented as a server, such as servers 304 and/or 306, depending upon design considerations.

In the depicted example, server 304 provides data, such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of networks of servers which provide equivalent content.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 300 also may be implemented as a number of different types of networks, such as, for example, an intranet, a local area network (LAN), or a wide area network (WAN). FIG. 1 is intended as an example and not as an architectural limitation for different embodiments of the present invention.

The following description is presented with respect to embodiments of the present invention, which can be embodied in the context of a data-processing system such as data-processing apparatus 100, computer software system 150 and data processing system 300 and network 302 depicted respectively FIGS. 1-3. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 4:
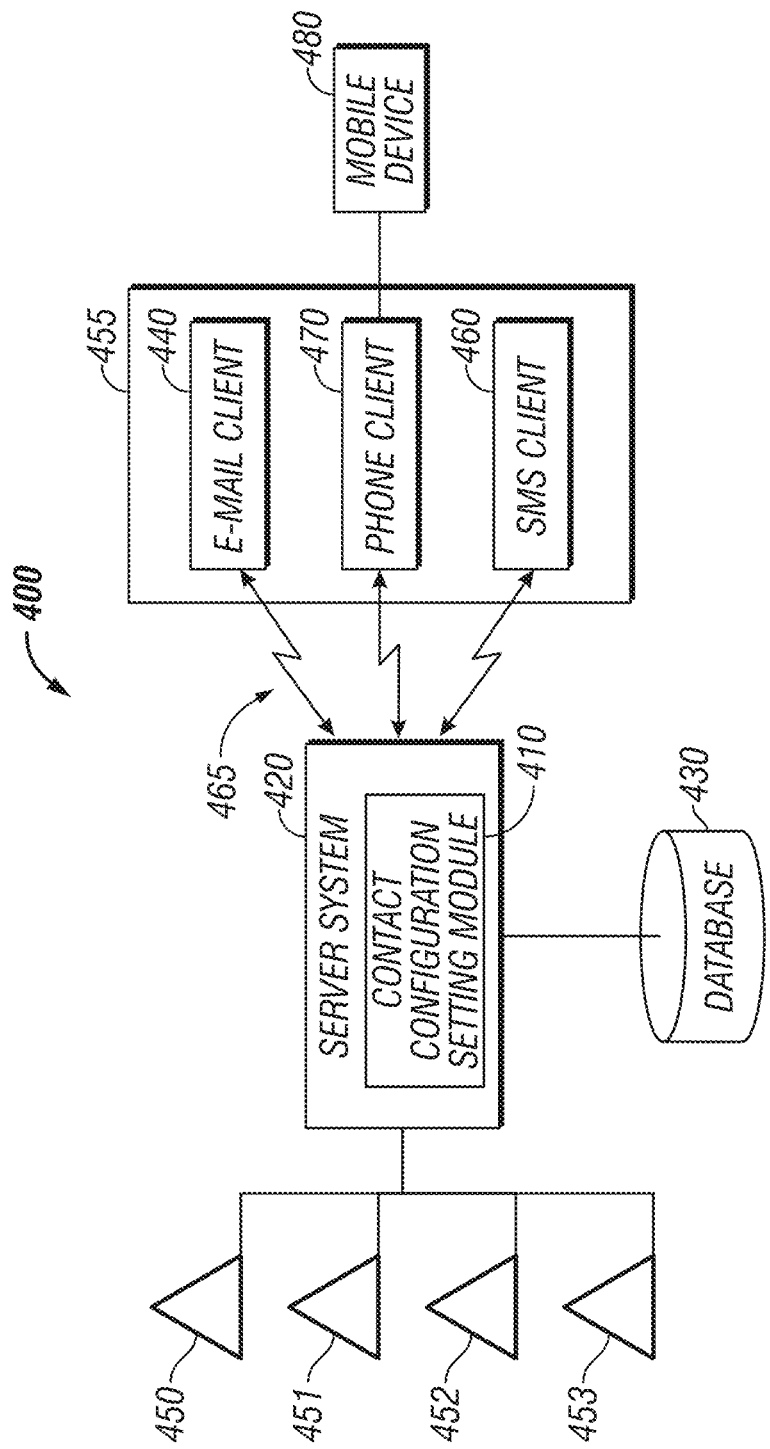
FIG. 4 illustrates a block diagram of a network e-mail system associated with a mobile device, which can be implemented in accordance with a preferred embodiment.

FIG. 4 illustrates a block diagram of a network e-mail message system 400 associated with a mobile device 480, which can be implemented in accordance with a preferred embodiment. The network e-mail message system 400 generally includes a server system 420 which can be configured to receive a number of e-mail messages 450, 451, 452 and 453 sent from an e-mail client 460 to another e-mail client via a unique user e-mail address. The server system 420 operates in conjunction with a database 430. The server system 420, as well as any application programs such as module 410 residing thereon, may access any number of applications and stored data. The server system 420 can be connected with a plurality of client stations 455, which may comprise an e-mail client 440, an SMS client 460 and a phone client 470 via a wireless communication network 465. In particular, the server system 420, along with plurality of client stations 455, is equipped or otherwise connected to its own respective wireless network transceiver (not shown), wherein a communication link between the server system 420 and the respective client stations 440, 460 and 470 may be established on demand.

The system 400 allows a user to directly access updates of a selected e-mail message thread associated with e-mail messages such as one of e-mail messages 450, 451, 452 and 453 and act on that message (e.g., to listen to the message) via a mobile device 480 utilizing the plurality of client stations 455. Note that the embodiments described herein generally refer to e-mail communications, although it is to be understood that the system and method described herein are applicable to other types of electronic communication messages. In one possible embodiment, the server system 420 can be associated with, for example, the data processing apparatus 100 acting as a mail transfer agent, which can be a computer program, or software application 152 that transfers electronic mail messages from one computer to another.

The contact configuration setting module 410 on the server system 420 allows user to directly subscribe to updates related to an e-mail message thread within the e-mail message 450-453 by adding a cell phone number or SMS data. The cell phone number and the Short Messaging Service (SMS) data can be tied to the ID of the e-mail message thread and can be stored in the database 430. It should be noted that the database 430 that resides on the server system 420 contains the number or SMS data assigned to the telephone or SMS service by the SMS client 460 and phone client 470, as well as data related to the subscribed e-mail message threads. SMS is generally a wireless messaging service that permits the transmission of a short text message from and/or to a mobile telephone terminal, regardless of whether the transmission originates and terminates on a mobile telephone, originates on a mobile telephone and terminates on a computer, or originates on a computer and terminates on a telephone. The server system 420 can be configured, such that, if an update related to the e-mail message thread is received, the server system 420 sends a message to the mobile device 480.

The message sent from the server system 420 possesses a selected protocol scheme, such as SMS or text-to-speech voice message, which is recognized by the mobile device 480 associated with the phone client 470. The mobile device 480 automatically access the server system 420 with a single user input action, such as by pressing one key on the phone's keypad. This single action by the user will provide the user with access to the updated e-mail message which the user can then respond to.

Accordingly, the user can easily and quickly act on the one updated e-mail message by subscribing the number assigned to the mobile device 480 to the server system 420. In this embodiment, the server system 420 includes the database 430 with information about service subscribers and users, such as cell phone identification data, so the server system 420 can correlate the identification data with a particular user's account. In one embodiment, the server system 420 automatically converts the retrieved e-mail message from text to a voicemail. The server system 420 then automatically plays that audio e-mail message to the user via the mobile device 480. The mobile device 480 can be automatically provided with number actions options in a menu format that can be performed for that e-mail message, such as listening, replying, forwarding, faxing, deleting or saving the e-mail message 450-453. The user can then act on the selected e-mail message via the desired menu selection. Accordingly, the user can immediately and directly access e-mail message updates on the mobile device 480 so as to be able to immediately act on that e-mail message.

Figure 5:
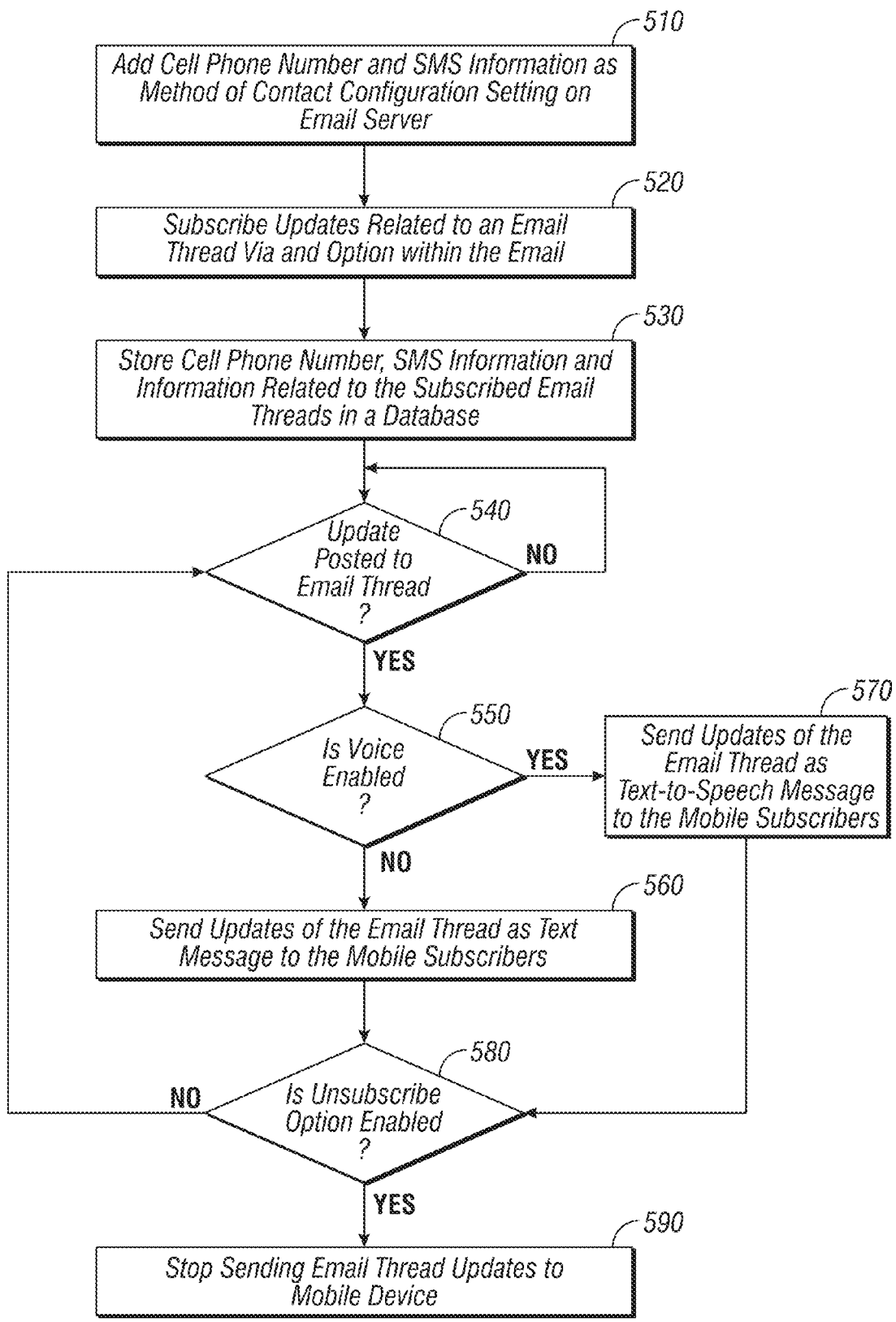
FIG. 5 illustrates a high level flow chart of operations illustrating logical operational steps of a method for providing cell phone subscription to e-mail message threads, in accordance with a preferred embodiment.

FIG. 5 illustrates a high level flow chart of operations illustrating logical operational steps of a method 500 for providing cell phone subscription of e-mail message threads, in accordance with a preferred embodiment. Note that the method 500 can be implemented in the context of a computer-useable medium that contains a program product. The cellular telephone number or SMS data assigned to a mobile device 480 can be added as a method of contact configuration setting with respect to the server system 420, as depicted at the block 510. A setting can be included in an individual's e-mail server account with respect to the cellular telephone number in order to ensure privacy of data; hence, the cellular telephone number cannot be visible to others. Thereafter, the user can subscribe to updates associated within the e-mail message 450-453 utilizing an option button, as illustrated at the block 520. The updates can be, for example, a reply to the e-mail message thread. The mobile number and the SMS data related to the subscription can be tied to the ID of the e-mail message thread on the server system 420. The number, SMS data assigned to the telephone or SMS service by the SMS client 460 and mobile client 470, as well as data related to the subscribed e-mail message threads can be stored in the database 430, as shown at block 530.

A determination can be made if an update is posted to the subscribed e-mail message thread, as shown at block 540. If an update is posted to the subscribed e-mail message thread, another determination can be made whether the voicemail option has been enabled, as depicted at block 550. If the voicemail option is enabled, the updates of the particular email thread can be sent to the mobile subscribers through text-to-speech message, as illustrated at block 570. Otherwise, the updates of the particular email thread can be sent to the mobile subscribers through text message, as shown at block 560. Thereafter, a determination can then be made whether the unsubscribe option has been enabled, as illustrated at block 580. If the unsubscribe option is enabled, unsubscribe e-mail message thread updates to the mobile device, as shown at block 590. Otherwise, each reply or update to the e-mail message thread can be received as a text message or text-to-speech message without any of the users needing to be involved. The method of FIG. 5 can be implemented with respect to a wireless communication device, such as mobile device 480, which was discussed earlier herein. Mobile device 480 may be a cellular telephone or another type of wireless communication device, such as, for example, a paging device, a PDA, and so forth. Mobile device 480 is preferably, however, a cellular telephone.

Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method described herein can be deployed as process software in the context of a computer system or data-processing system as that depicted in FIGS. 1-3.

Figure 6:
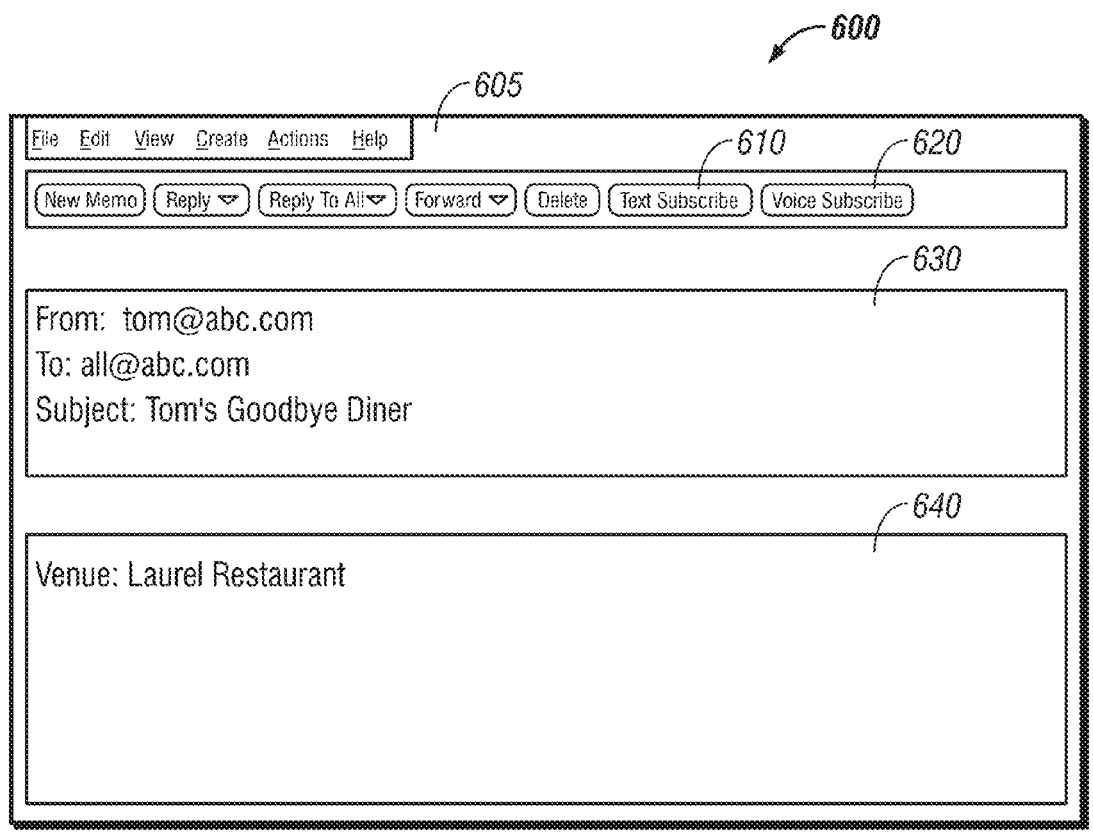
FIGS. 6-7 illustrate a GUI for subscribing the mobile device to receive updates associated with a particular e-mail message thread, in accordance with a preferred embodiment.
Figure 7:
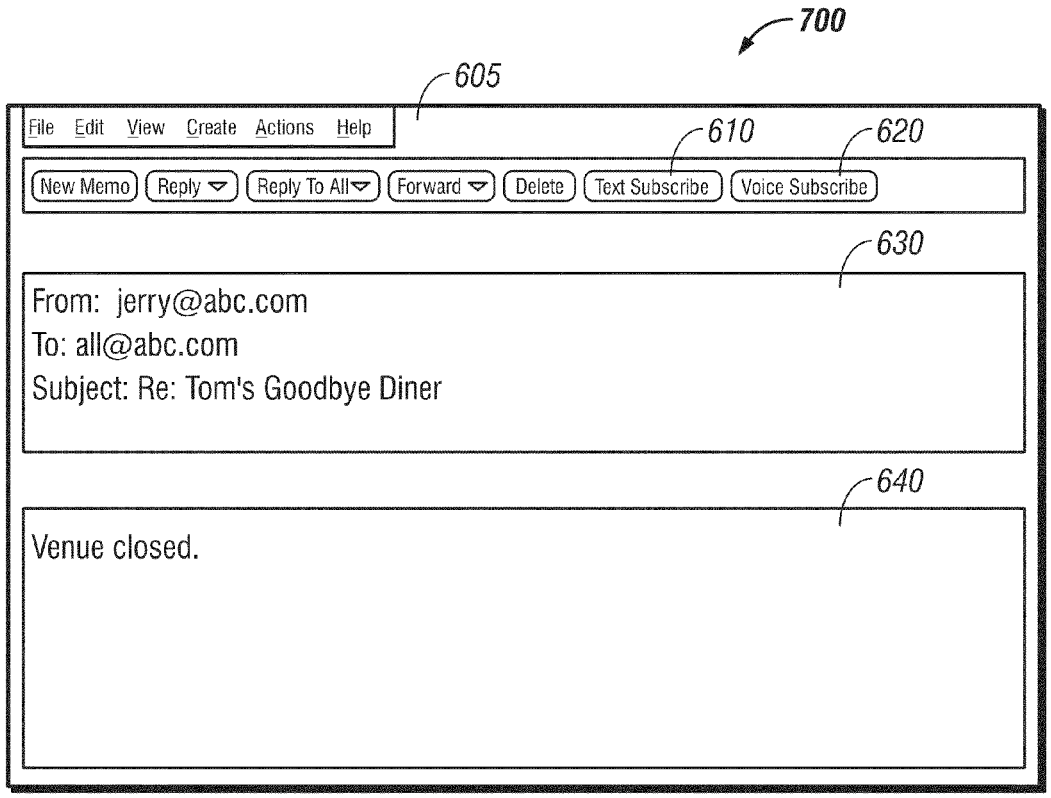

FIGS. 6-7 illustrates a graphical user interface (GUI) 600 and 700 for subscribing the mobile device 480 to receive updates associated with a particular e-mail message thread, in accordance with a preferred embodiment. The GUI 600 and 700 generally includes a main menu 605, an e-mail message header 630 and an e-mail message body 640. The e-mail message header 630 consists of fields, generally including "From" address, "To" address and "Subject" which includes a brief summary of the message. The e-mail message body 640 includes the content of the message. The main menu 605 further includes tabs, such as, for example, tab 610 and tab 620, which respectively permit a user to subscribe to text and voice updates related to the e-mail message thread. The user can receive updates related to the e-mail message thread in the form of a text message by "clicking" the option "text subscribe" via tab 610. Similarly, the user can receive updates related to the e-mail message thread in the form of voice-based message by clicking the option "voice subscribe" via tab 620, which can be helpful for visually impaired.

For example, consider a group of people celebrating the end of a project by going out for a social night. An e-mail message can be sent out to all members to inform them of the necessary details such as, for example, shown in FIG. 6. The members can also subscribe their mobile device for receiving updates for that particular thread via the option buttons 610 and 620. A few of the people arrive at the location and find out that the venue will be closing early for the night. Hence, a reply to the e-mail message can be sent to all members, as depicted in FIG. 7.

The updated message related to the subscribed e-mail message thread can be sent to mobile device 480 via a text or text-to-speech voice message allowing users to either see or listen to reply to the e-mail message thread. This way when members of the team find that the venue is closed they respond to the e-mail message thread and all users who subscribed to that thread can receive updates on their phone of the change. Note that the term "GUI" as utilized herein generally refers to a type of environment that represents programs, files, options and so forth by means of graphically displayed icons, menus, and dialog boxes on a computer monitor screen. The user can interact with the GUI to select and activate the options by pointing and clicking with a user input device such as, for example, a pointing device such as a mouse, and/or with a keyboard.

The server system 420 can send an SMS to all mobile subscribers when an update is posted to the thread. The message only contains the update to that thread. If the mobile device user desires to send a reply, the reply can be sent to the e-mail message server 420 and the e-mail message server 420 distributes the updates to all the users on the thread, which is similar to blind carbon copy. Hence, all e-mail message addresses on the thread need not be included in the text message. Each reply to the e-mail message thread can be received as a text message or as voicemails, which can be helpful for the visually impaired. Similarly, the number assigned to the mobile device 480 cannot be visible to others in order to ensure privacy of the data.

Figure 8:
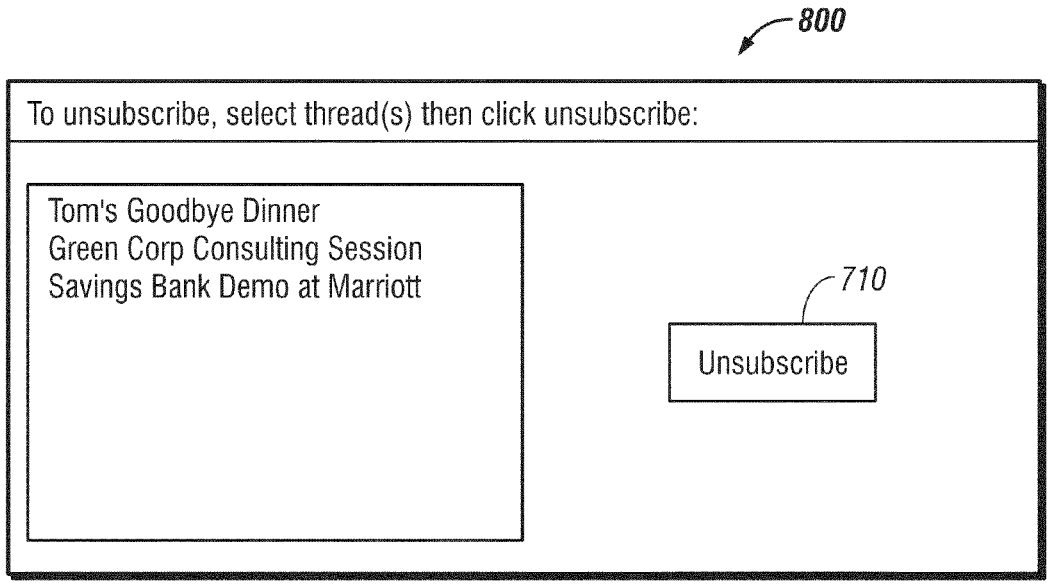
FIG. 8 illustrates a GUI to unsubscribe the mobile device from receiving e-mail messages associated with the e-mail message thread, in accordance with a preferred embodiment.

FIG. 8 illustrates a GUI 800 that permits a user to unsubscribe his or her mobile device 480 and thereby prevent receipt of e-mail messages associated with the e-mail message thread, in accordance with a preferred embodiment. The GUI 800 includes an option button 710 that when activated, initiates an "unsubscribe" to prevent receipt of e-mail updates or alerts from the e-mail message thread. Such an option can prevent the user from receiving alerts or updates to the e-mail message thread. The GUI 800 can be utilized in association with the method 500 illustrated and described earlier herein.

An advantage of the method 500 and the GUI 800 is that such an approach can be utilized to convert text to speech and unify the e-mail message with the voice capabilities of the mobile device, thereby allowing for universal access of all messages at anytime and anywhere. Another advantage from such an approach stems from the fact that updates can be sent as text or text-to-speech voicemails, allowing users to either see or listen to any reply to the e-mail message thread. Also, if any of the individuals that arrived at the venue have sent a response to the e-mail message and all others that subscribed to the thread can be alerted via a text message. Similarly, users can "unsubscribe" from receiving alerts that they have already subscribed to by selecting, for example, the unsubscribe button 710 depicted in FIG. 8.

The method 500 for providing a cellular telephone subscription with respect to an e-mail message thread does not require the use of a PDA (personal digital assistant) telephone to receive updates 450. A basic cellular telephone is capable of the function in association with the disclosed embodiments, which provides, for example, a sample image of subscription options to the user(s) within the e-mail message itself. Thus, such as an approach, as described herein, can provide an easy and quick access for transmitting important e-mail message updates to a mobile device, such as mobile device 480.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, telephones, and any other system capable of processing, transmitting, receiving, capturing and/or storing data.

Based on the foregoing, it can be appreciated that a method, system and computer-usable medium is disclosed for providing a subscription to an e-mail message thread via a mobile device. By implementing such an approach, a user is provided with the capability of subscribing to an e-mail message utilizing a mobile device based on a unique e-mail message thread ID associated with an e-mail message thread within the e-mail message. The user is then provided with updated data regarding the e-mail message thread in response to activity associated with the e-mail message thread. The updated data can be provided to the user in a form of a text message, a text-to-speech voicemail message, and so forth. Additionally, a telephone number associated with the mobile device can be added to a database stored in an e-mail message server that manages the e-mail message and the e-mail message thread in order to subscribe to the e-mail message utilizing the mobile device. SMS data associated with the user can also be added to the database. The user is also permitted to subscribe or unsubscribe to the e-mail message in response to a selection of a particular option in the e-mail message by the user.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for processing a subscription to an e-mail message thread, said method comprising:

assigning, by a processor of a computer system, Short Message Service (SMS) data to a mobile device;

said processor adding both a telephone number associated with the mobile device and the assigned SMS data to a setting in a database stored in an e-mail message server;

after said adding, said processor creating a subscription to updates related to an e-mail message thread associated with the e-mail message server, said creating comprising correlating the telephone number and the SMS data to a unique e-mail message thread identifier of the e-mail message thread, said creating being performed in response to the processor being directed by a user to perform said creating; and said processor sending, to the mobile device via the e-mail message server, the updates related to the e-mail message thread.

2. The method of claim 1, said method further comprising:

after said creating the subscription, said processor receiving a click, by the user, of an Unsubscribe button graphically displayed at a graphical user interface (GUI); and in response to said receiving the click, by the user, of the Unsubscribe button, said processor unsubscribing the user from receiving the updates related to the e-mail message thread.

3. The method of claim 1, said method further comprising:

said processor receiving a click, by the user, of at least one Subscribe button graphically displayed at a graphical user interface (GUI) to subscribe; and in response to said receiving the click, by the user, of the at least one Subscribe button, said processor subscribing the user to receive the updates related to the e-mail message thread.

4. The method of claim 3, wherein the at least one Subscribe button is selected from the group consisting of a Text Subscribe button for the user to receive text updates related to the e-mail message thread, a Voice Subscribe button for the user to receive voice updates related to the e-mail message thread, and both the Text Subscribe button and the Voice Subscribe button.

5. The method of claim 3, said method further comprising:

after said creating the subscription, said processor receiving a click, by the user, of an Unsubscribe button graphically displayed at a graphical user interface (GUI); and in response to said receiving the click, by the user, of the Unsubscribe button, said processor unsubscribing the user from receiving the updates related to the e-mail message thread, wherein the at least one Subscribe button and the Unsubscribe button are graphically displayed at a GUI within an e-mail message.

6. The method of claim 1, wherein each update is independently selected from the group consisting of a text update, a voice update, or both the text update and the voice update.

7. The method of claim 1, wherein the setting is included in an account, of the user, with respect to the telephone number.

8. A computer system comprising a processor, a memory coupled to the processor, and a computer readable storage device coupled to the processor, said storage device containing program code configured to be executed by the processor via the memory to implement a method for processing a subscription to an e-mail message thread, said method comprising:

said processor assigning Short Message Service (SMS) data to a mobile device;

said processor adding both a telephone number associated with the mobile device and the assigned SMS data to a setting in a database stored in an e-mail message server;

after said adding, said processor creating a subscription to updates related to an e-mail message thread associated with the e-mail message server, said creating comprising correlating the telephone number and the SMS data to a unique e-mail message thread identifier of the e-mail message thread, said creating being performed in response to the processor being directed by a user to perform said creating; and said processor sending, to the mobile device via the e-mail message server, the updates related to the e-mail message thread.

9. The computer system of claim 8, said method further comprising:

after said creating the subscription, said processor receiving a click, by the user, of an Unsubscribe button graphically displayed at a graphical user interface (GUI); and in response to said receiving the click, by the user, of the Unsubscribe button, said processor unsubscribing the user from receiving the updates related to the e-mail message thread.

10. The computer system of claim 8, said method further comprising:

said processor receiving a click, by the user, of at least one Subscribe button graphically displayed at a graphical user interface (GUI) to subscribe; and in response to said receiving the click, by the user, of the at least one Subscribe button, said processor subscribing the user to receive the updates related to the e-mail message thread.

11. The computer system of claim 10, wherein the at least one Subscribe button is selected from the group consisting of a Text Subscribe button for the user to receive text updates related to the e-mail message thread, a Voice Subscribe button for the user to receive voice updates related to the e-mail message thread, and both the Text Subscribe button and the Voice Subscribe button.

12. The computer system of claim 10, said method further comprising:

after said creating the subscription, said processor receiving a click, by the user, of an Unsubscribe button graphically displayed at a graphical user interface (GUI); and in response to said receiving the click, by the user, of the Unsubscribe button, said processor unsubscribing the user from receiving the updates related to the e-mail message thread, wherein the at least one Subscribe button and the Unsubscribe button are graphically displayed at a GUI within an e-mail message.

13. The computer system of claim 8, wherein each update is independently selected from the group consisting of a text update, a voice update, or both the text update and the voice update.

14. The computer system of claim 8, wherein the setting is included in an account, of the user, with respect to the telephone number.

15. A computer readable storage device comprising program code stored therein, said program code configured to be executed by a processor of a computer system to implement a method for establishing a subscription to an e-mail message thread, said method comprising:

said processor assigning Short Message Service (SMS) data to a mobile device;

said processor adding both a telephone number associated with the mobile device and the assigned SMS data to a setting in a database stored in an e-mail message server;

after said adding, said processor creating a subscription to updates related to an e-mail message thread associated with the e-mail message server, said creating comprising correlating the telephone number and the SMS data to a unique e-mail message thread identifier of the e-mail message thread, said creating being performed in response to the processor being directed by a user to perform said creating; and said processor sending, to the mobile device via the e-mail message server, the updates related to the e-mail message thread.

16. The storage device of claim 15, said method further comprising:

after said creating the subscription, said processor receiving a click, by the user, of an Unsubscribe button graphically displayed at a graphical user interface (GUI); and in response to said receiving the click, by the user, of the Unsubscribe button, said processor unsubscribing the user from receiving the updates related to the e-mail message thread.

17. The storage device of claim 15, said method further comprising:

said processor receiving a click, by the user, of at least one Subscribe button graphically displayed at a graphical user interface (GUI) to subscribe; and in response to said receiving the click, by the user, of the at least one Subscribe button, said processor subscribing the user to receive the updates related to the e-mail message thread.

18. The storage device of claim 17, wherein the at least one Subscribe button is selected from the group consisting of a Text Subscribe button for the user to receive text updates related to the e-mail message thread, a Voice Subscribe button for the user to receive voice updates related to the e-mail message thread, and both the Text Subscribe button and the Voice Subscribe button.

19. The storage device of claim 17, said method further comprising:

after said creating the subscription, said processor receiving a click, by the user, of an Unsubscribe button graphically displayed at a graphical user interface (GUI); and in response to said receiving the click, by the user, of the Unsubscribe button, said processor unsubscribing the user from receiving the updates related to the e-mail message thread, wherein the at least one Subscribe button and the Unsubscribe button are graphically displayed at a GUI within an e-mail message.

20. The storage device of claim 15, wherein each update is independently selected from the group consisting of a text update, a voice update, or both the text update and the voice update.

* * * * *